United States Patent
Cogiel et al.

(10) Patent No.: US 11,460,319 B2
(45) Date of Patent: Oct. 4, 2022

(54) METHOD AND DEVICE FOR STORING TRAVEL DISTANCE DATA

(71) Applicants: Bayerische Motoren Werke Aktiengesellschaft, Munich (DE); Robert Bosch GmbH, Stuttgart (DE)

(72) Inventors: Janus Cogiel, Munich (DE); Holger Kahle, Stuttgart (DE)

(73) Assignees: Robert Bosch GmbH, Stuttgart (DE); Bayerische Motoren Werke Aktiengesellschaft, Munich (DE)

( * ) Notice: Subject to any disclaimer, the term of this patent is extended or adjusted under 35 U.S.C. 154(b) by 317 days.

(21) Appl. No.: 16/771,271

(22) PCT Filed: Jan. 24, 2019

(86) PCT No.: PCT/EP2019/051739
§ 371 (c)(1),
(2) Date: Jun. 10, 2020

(87) PCT Pub. No.: WO2019/145414
PCT Pub. Date: Aug. 1, 2019

(65) Prior Publication Data
US 2020/0378789 A1 Dec. 3, 2020

(30) Foreign Application Priority Data
Jan. 24, 2018 (DE) .......................... 102018101523.2

(51) Int. Cl.
G01C 22/02 (2006.01)
G01C 21/34 (2006.01)
G06F 21/60 (2013.01)

(52) U.S. Cl.
CPC ......... *G01C 22/02* (2013.01); *G01C 21/3469* (2013.01); *G06F 21/602* (2013.01)

(58) Field of Classification Search
None
See application file for complete search history.

(56) References Cited

U.S. PATENT DOCUMENTS 6,002,973 A 12/1999 Giegold
6,768,966 B2 7/2004 Ohle et al.
(Continued)

FOREIGN PATENT DOCUMENTS

DE 19624041 A1 12/1997
DE 10026738 C1 10/2001
(Continued)

OTHER PUBLICATIONS

German Patent Office, Office Action issued in DE 10 2018 101 523.2, dated Sep. 21, 2018 (8 pages).
(Continued)

*Primary Examiner* — Todd Melton
(74) *Attorney, Agent, or Firm* — Wood Herron & Evans LLP

(57) ABSTRACT

A method and a device for storing travel distance data are provided. In the method, travel distance data is stored in a non-volatile first memory area of a memory device, but only if this results in an increase in the total travel distance already previously stored therein. A first reference total travel distance, which is stored in a second memory area of the memory device, is compared with the total travel distance data which is currently stored in the first memory area. If, according to the first comparison, the total travel distance has increased compared with the first reference total travel distance according to a predetermined first criterion, updated first reference travel distance data corresponding to the total travel distance is stored in the second memory area in an encrypted form.

18 Claims, 2 Drawing Sheets

(56) References Cited

U.S. PATENT DOCUMENTS 6,772,090 B2 * 8/2004 Hutton ................. G06F 7/5055
                                                                701/19
9,361,739 B2    6/2016 Biondo et al.

FOREIGN PATENT DOCUMENTS

| DE | 10138703 C1     | 3/2003 |
| DE | 102013202474 A1 | 8/2013 |
| DE | 102013221489 A1 | 4/2015 |

OTHER PUBLICATIONS

International Searching Authority, Search Report and Written Opinion issued in PCT/EP2019/051739, dated Jan. 24, 2019 (13 pages).

* cited by examiner

METHOD AND DEVICE FOR STORING TRAVEL DISTANCE DATA

CROSS-REFERENCE TO RELATED APPLICATION

This application is a national phase entry of, and claims priority to, International Application No. PCT/EP2019/051739, filed Jan. 24, 2019, which claims priority to German Patent Application No. 10 2018 101 523.2, filed on Jan. 24, 2018, with the same title as listed above. The above-mentioned patent applications are incorporated herein by reference in their entireties.

TECHNICAL FIELD

This application relates to a method and a device for storing travel distance data, specifically a distance traveled by a vehicle such as a motor vehicle, as well as a vehicle with such a device.

BACKGROUND

Vehicles, in particular motor vehicles, are usually equipped with a counter for a distance traveled (such as a counter counting kilometers traveled or a mileage counter) which is set up to determine the total distance traveled by the vehicle since it entered into service. As a rule, such counters for a distance traveled comprise a counting device which detects and, if applicable, adds up the measured values obtained by the vehicle in order to determine the total distance traveled, e.g., in kilometers or miles or the like. For example, the revolutions of a wheel of the vehicle can be detected and added up to determine the total distance traveled.

A precise and reliable indication of the total distance traveled is important in several respects, since maintenance work on the vehicle should be carried out in dependence on the total distance traveled and the determination of the economic value of the vehicle, for example when it is sold, is usually determined inter alia on the basis of the total distance traveled.

Typically, the current total distance traveled is recorded in a control unit, i.e. stored, and displayed in a combination instrument of the vehicle. Various approaches are known in order to protect the stored total distance traveled from manipulation, for example by storing the total distance traveled in an encrypted form in the control unit.

It would therefore be desirable to provide a further improved way of providing protection for an odometer for a vehicle and thereby assure an accurate accounting of distance traveled data for owners and operators of vehicles.

SUMMARY

To address these and other problems with conventional designs as identified above, in accordance with one embodiment of the invention, a method is provided of storing, in a memory device, travel distance data which characterizes a total distance traveled by a vehicle, in particular a motor vehicle. The method includes: (i) storing travel distance data in a non-volatile first memory area of the memory device, which travel distance data characterizes a total distance traveled by the vehicle, determined on the basis of vehicle data determined by the vehicle, if this results in an increase in the total travel distance already previously stored therein by corresponding travel distance data, wherein the first memory area is set up so as not to permit any change, such as overwriting, of the travel distance data that is already stored therein, insofar as this change corresponds to a reduction in the corresponding total travel distance; (ii) comparing, within the framework of a first comparison, a first reference total travel distance, which is stored in a second memory area of the memory device by corresponding first reference travel distance data, which second memory area is different from the first memory area, with the total travel distance which is currently stored in the first memory area by the travel distance data; and (iii) if, according to the result of the first comparison, the total travel distance has increased compared with the first reference total travel distance according to a predetermined first criterion, storing updated first reference travel distance data corresponding to the total travel distance in the second memory area in an encrypted form.

In one embodiment, the vehicle data may be included in a message which is sent via a vehicle bus, e. g. a CAN bus, by at least one vehicle component, such as a control unit. The vehicle data may include the current total distance traveled as a numerical value in digital form, for example in the form of sensor data, or in the form of other signals, on the basis of which the current total distance traveled can be determined, in particular derived or read out.

For the purposes of this disclosure, the storing of travel distance data and/or reference travel distance data is meant to be understood to refer to writing the same into a memory area, preferably of a non-volatile data memory. The travel distance and/or reference travel distance data can preferably be stored at a memory location of the memory area which had already been occupied by travel distance data and/or reference travel distance data stored at an earlier point in time, whereby this previously stored data is replaced, in particular overwritten. Alternatively, the travel distance data and/or the reference travel distance data can be stored at a memory location of the memory area which is not yet occupied, i.e. written into the memory area in addition to this previously stored data. A mixture of these two alternatives is also conceivable.

The first memory area is preferably used as the primary storage for the total distance traveled and is preferably provided in, or formed by, a combination instrument of the vehicle. A display of the total distance traveled by the combination instrument is thus preferably based on the travel distance data which is stored in the first memory area.

The memory device may include one or more data memories, such as separate, non-volatile, data memories. The one data memory or each of the plurality of data memories may comprise one or more memory areas. For example, a data memory can be constructed as an EEPROM with the first and the second memory area.

The information regarding the total travel distance which is stored in the first memory area by the travel distance data is protected against manipulation, such as resetting, since when the total travel distance is stored, for example by a changing, such as an updating, of travel distance data which is already stored in the first memory area, the total travel distance which is represented thereby can only be increased, in particular incrementally. Preferably, the first memory area is physically configured for this purpose, for example in an EEPROM, in such a way that only such changes to the travel distance data which is stored in the first memory area are possible which correspond to an increase in the total travel distance represented by it. In this way, a manipulation of the travel distance data in such a way that the manipulated travel distance data correspond to a shortened total travel distance can be prevented or at least made considerably more difficult.

The first comparison of the current total distance traveled with the first reference total travel distance can preferably be carried out by a computing device set up for this purpose, in particular the combination instrument. For this purpose, the computing device is preferably coupled to the vehicle bus, the first memory area and/or the second memory area.

Because the travel distance data is stored in the first memory area, in particular in a cyclic manner according to a predetermined processing clock, but the first reference travel distance data is stored in the second memory area only when a specific result of the first comparison is present, this results in different storage frequencies, as a rule, for the storage processes in the first and the second memory areas, wherein the first reference travel distance data in the second memory area is stored less frequently than the travel distance data in the first memory area. This means that the memory areas can be constructed differently. The first memory area can be optimized for particularly short access times, while the second memory area can be designed for the storage of particularly large amounts of data.

The first reference total travel distance stored in the second memory area by the first reference travel distance data is protected against manipulation, in particular against resetting, since the first reference travel distance data is cryptographically encrypted as part of the storage process. Preferably, the first reference travel distance data is encrypted with a symmetric encryption method, in particular with AES-128, preferably with AES-192, particularly preferably with AES-256 or with a comparable standard. The cryptographic key used in this process may be stored in the second memory area, which can be accessed by the control device for encrypting or decrypting the reference travel distance data. Alternatively, the cryptographic key may however also be stored outside the second memory area, for example in a separate memory area on a separate hardware module.

The redundant storage of the total distance traveled in the first and the second memory area by the corresponding travel distance data or reference travel distance data, respectively, therefore enables a particularly reliable protection against manipulation of the total travel distance stored in them. The incremental storage, as it is referred to, in the first memory area, which, preferably due to its construction, exclusively permits an increase in the total travel distance represented by the travel distance data stored therein, secures the total distance traveled in a manner which is complementary to the encrypted storage of the first reference total travel distance in the second memory area. The effort which is required for a manipulation is thereby increased by a particular large extent.

Accordingly, embodiments of the invention thus allow an improved protection of a total distance traveled, which is stored in a vehicle, to be achieved.

In another embodiment, the second memory area is larger than the first memory area, i. e. the second memory area has more memory than the first memory area. The first memory area is set up to store only a first amount of travel distance data by which a single total travel distance can be characterized. Alternatively, or in addition, the second memory area is set up to store a second amount of first reference travel distance data by which a plurality of first reference total travel distances can be characterized. In this way, the total distance traveled can be stored in the form of the travel distance data in the first memory area at high frequency, i. e. according to a fast processing clock in small increments, while a history of the total distance traveled can be stored in the second memory area. Such small increments are short spatial distances, such as 5 km or less, preferably 2 km or less, in particular 1 km or less. The low frequency storing of the first reference travel distance data can prevent the second memory area from overflowing.

In a further embodiment, in case the total travel distance has decreased when compared with the first reference total travel distance according to the result of the first comparison and according to a predetermined criterion, the travel distance data stored in the first memory area is updated in such a way that it now corresponds to the first reference total travel distance. In this way, a malfunction of the first memory area and/or faulty vehicle data can reliably be compensated for. A manipulation of the travel distance data which is stored in the first memory area, or of the total distance traveled which is represented by it can be detected by the first comparison, whereby the manipulation can be prevented or reversed by the updating of the travel distance data as described above.

In yet another embodiment, in addition to updating the travel distance data in the first memory area, indicator information regarding the occurrence of the comparison result, in particular a warning regarding manipulation, is stored or output at an interface in case the total travel distance has decreased when compared with the first reference total travel distance according to the result of the first comparison and according to the predetermined criterion. As a result of the storing of the indicator information, it is possible, for example for further vehicle components or in a workshop, to recognize quickly and easily that a manipulation could have taken place. The indicator information can be transmitted, or made accessible, via the interface to, for example, a relevant authority, a workshop and/or the vehicle manufacturer, as a result of which appropriate measures can reliably be taken with regard to prosecution and/or prevention of the manipulation attempt.

In a further embodiment, the travel distance data which is stored in the first memory area is stored in the second memory area as first reference travel distance data if, in the course of the first comparison, it is determined that the second memory area does not contain any first reference travel distance data. As a result of this, the method according to embodiments of the invention can also be executed reliably and without errors in the event of a first initialization or a reset, as it is referred to, i. e. a resetting, of the second memory area, for example when a non-volatile data memory which is assigned to the second memory area is being exchanged.

Within the framework of the first comparison, identification data of the memory areas, in particular of the data memories assigned to them, is preferably compared with identification data which is stored, for example, in the computing device, so that, for example in the event of there being a lack of correspondence between the respective identification data, it is possible to conclude that at least one of the memory areas has been changed, in particular in the event of an exchange or repair of the respective data memory. The data in the modified memory areas can then be restored on the basis of the travel distance data or the first reference travel distance data which is stored in an unmodified memory area. Thus, a hardware-based manipulation attempt of the total distance traveled can be prevented or at least made more difficult.

In another embodiment, the method further comprises: (i) comparing, within the framework of a second comparison, the total travel distance, which is stored by the travel distance data in the first memory area, with a second reference total travel distance, which is stored by second reference travel distance data in a further memory area; and (ii) if, according to the result of the second comparison, the total travel distance has increased with respect to the second reference total travel distance in accordance with a predetermined second criterion, storing updated second reference travel distance data in the further memory area in an encrypted form, which updated second reference travel distance data corresponds to the total travel distance. In this way, a further protection of the total distance traveled is made possible, in particular a further redundant storage of the total travel distance in the form of second reference travel distance data, and thus the security with regard to manipulation attempts is increased.

In a further embodiment, the first criterion and/or the second criterion is defined in such a way that it is met if the total distance traveled, as characterized by the travel distance data stored in the first memory area, is greater than the first reference travel distance or, respectively, the second reference travel distance by more than 10 km, preferably by more than 100 km, in particular by more than 1000 km. In this context, the total distance traveled, which is characterized by the travel distance data which is stored in the first memory area, is preferably increased in small increments, in particular by the travel distance data in the first memory area being overwritten or changed in an appropriate manner. In this context, the total travel distance, which is characterized by reference travel distance data which stored in the second or the further memory area is preferably increased in larger increments, in particular by the reference travel distance data being written to the second or the further memory area in addition to already existing reference travel distance data. By virtue of the above definition of the first and/or the second criterion, an overflow of the second and/or the further memory area can thus reliably be avoided, even if a substantially continuous storing of travel distance data, or at least a storing of travel distance data at a high frequency, takes place in the first memory area.

In yet another embodiment, a current total fuel consumption of the vehicle which is derived from the vehicle data is taken into account in the course of the comparing within the framework of the first comparison and/or the second comparison. The protection of the total distance traveled, in particular against manipulation, is thus further improved, since an adjustment of the total fuel consumption which is plausible with regard to the total distance traveled, would now also have to be carried out in order for a successful manipulation to be performed. The plausibility of an increase in the total distance traveled which is determined within the framework of the first comparison can be checked by checking the total fuel consumption, in particular whether and, if so, by how much the current total fuel consumption has increased when compared with a total fuel consumption at an earlier point in time.

A total fuel consumption of the vehicle in the sense of this disclosure is the amount of fuel which has been consumed since the vehicle was put into service, as for example obtained approximately by multiplying the average fuel consumption of the vehicle by the total distance traveled. Apart from the total consumption of traditional liquid fuels such as for example petrol, diesel or the like, the total fuel consumption can also be understood to refer to the total consumption of electrical energy, for example in vehicles driven by an electric motor. As a result of this, the plausibility of an increase in the total distance traveled as determined within the framework of the first comparison can also be checked for vehicles driven by an electric motor.

In another embodiment, the first reference travel distance data is stored in the second memory area and/or, if applicable, the second reference travel distance data is stored in the further memory area if the current total fuel consumption of the vehicle has increased by more than 100 liters, preferably by more than 10 liters, in particular by more than 1 liter, when compared with a total fuel consumption of the vehicle at an earlier point in time, in particular a point in time when the last storage of first and/or second reference travel distance data took place. In this way, the storage frequency with which the second and/or the further reference travel distance data is stored in the second or, respectively, the further memory area can be maintained even if the vehicle data on the basis of which the total travel distance is determined is manipulated, and the manipulation can be detected by a plausibility test of the total fuel consumption and the total distance traveled.

In a further embodiment, the first reference travel distance data in the second memory area and/or, if applicable, the second reference travel distance data in the further memory area is encrypted and/or decrypted by accessing at least one cryptographic key which is stored in a key storage. The key storage is preferably constructed separately from the first, second and/or the further memory area. The key storage can be constructed as a hardware security module. In this way, any manipulation of the first and/or the second reference total travel distance or the first and/or the second reference travel distance data can reliably be prevented or at least made more difficult.

In yet another embodiment, a history of the total distance traveled is generated in the second memory area and/or in the further memory area by first reference travel distance data or second reference travel distance data respectively being stored in addition to reference travel distance data already stored in the second or the further memory area. Preferably, the history generated in the second and/or the further memory area is subjected to a plausibility test within the framework of the first and/or the second comparison, in particular whether the total travel distances characterized by the first or second reference travel distance data are becoming increasingly larger. In this way, the protection of the total travel distance stored in the vehicle is further improved, since not only the current reference total travel distance but also the entire history of the total travel distance would have to be adapted in order for a manipulation of the total travel distance to be performed.

In one embodiment, the travel distance data is stored in the first memory area in such a way that the current total distance traveled which is characterized by the travel distance data is increased incrementally by a predetermined value when compared with the total distance traveled at the earlier point in time. Preferably, the travel distance data is stored in regular, in particular spatial, intervals whose width is defined by the predetermined value. The predetermined value results from the processing clock with which the method is carried out.

The predetermined value may for example be 100 m, preferably 500 m, in particular 1 km, so that, at an average traveling speed of the vehicle, such as for example at 50 km/h, the total travel distance which is stored in the form of travel distance data in the first memory area is updated at short time intervals, for example at least every 5 minutes, preferably at least every 2 minutes, in particular at least every minute. In this way, the travel distance data from the first memory area can be used in order to display, in a reliable and precise manner, for example in a combination instrument of the vehicle, the total distance traveled.

Further embodiments of the invention relate to a device for storing travel distance data which device is configured to carry out the method as described above. By virtue of the fact that storage of the total distance traveled can be carried out in two different memory areas, one of which is arranged for secure storage, according to which only an increase in the total travel distance, which is stored therein by travel distance data, can take place, and the other is arranged for encrypted storage, a particularly reliable protection of the total travel distance is possible.

In an embodiment, the device comprises a memory device which has at least two non-volatile data memories which are spatially separated from each other, wherein each of the non-volatile data memories provides at least one of the memory areas. This allows the first and second memory areas to be constructed in an effective manner in order to be suitable for the incremental storage, as it is referred to, of the travel distance data, or for the encrypted storage of the first reference travel distance data, respectively. The protection of the stored total travel distance can thus be further increased.

In a further embodiment, at least one of the non-volatile data memories is constructed as one of the following: (i) EEPROM, (ii) flash memory, or (iii) reference database external to the vehicle. On an EEPROM, the travel distance data can for example be stored incrementally at a high frequency. On a flash memory, the reference travel distance data can for example be stored in large quantities and with strong encryption. By virtue of the storing of the reference travel distance data in a reference database external to the vehicle, an unauthorized access to the reference travel distance data can be prevented or at least be made considerably more difficult.

Additional embodiments of the invention relate to a vehicle, in particular a motor vehicle, with a device as described above.

The features and advantages described in relation to any of the embodiments described above may be applicable and may be combined with the features and advantages of other embodiments without departing from the scope of this disclosure.

BRIEF DESCRIPTION OF THE DRAWINGS

The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
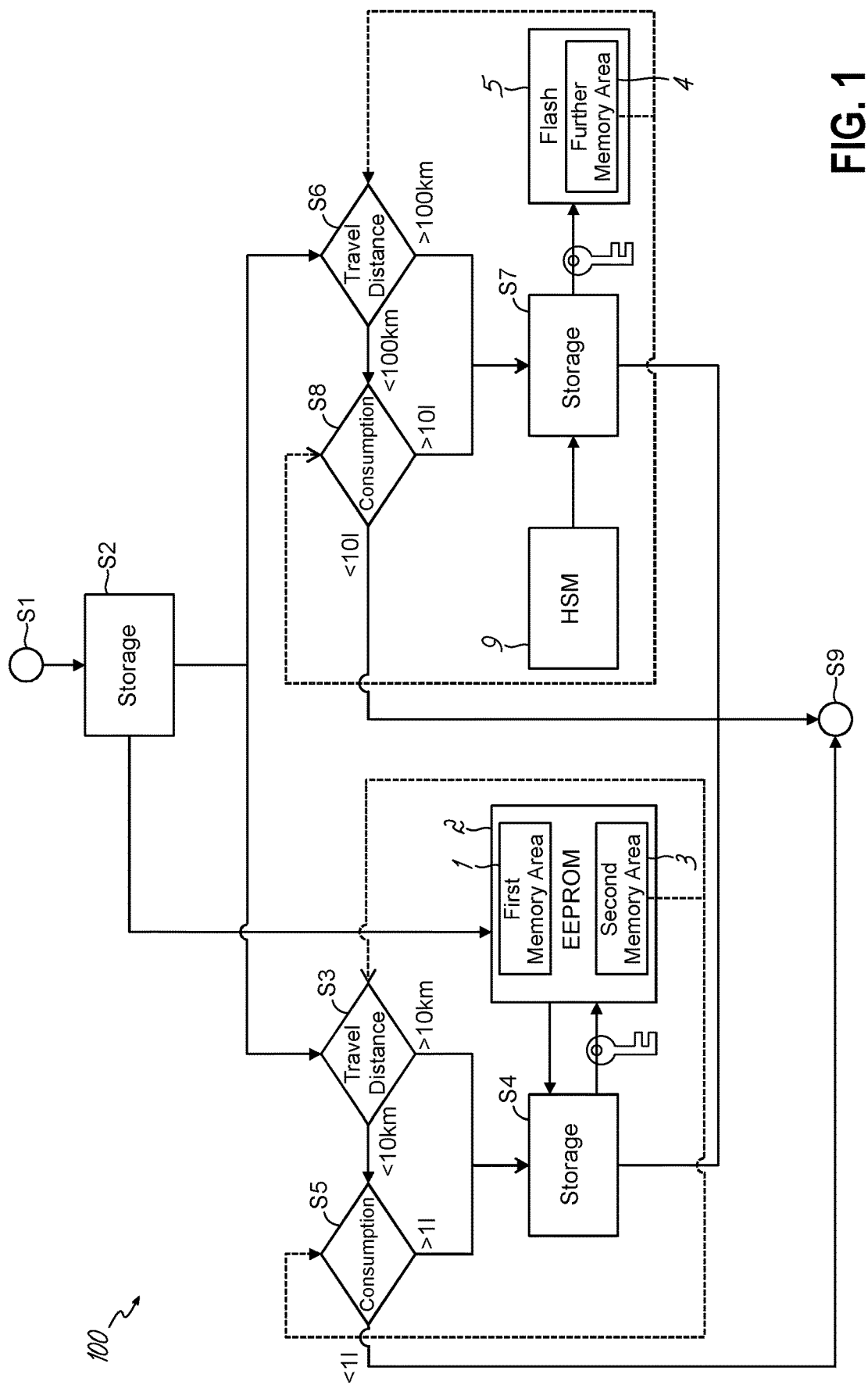
FIG. 1 is a flowchart showing one embodiment of a method in accordance with the invention.

FIG. 1 shows an example embodiment of the method 100 in accordance with the invention for storing travel distance data which characterizes a total distance traveled by a vehicle, in particular a motor vehicle.

In a method step S1, a total travel distance which has been traveled by the vehicle up to the current point in time is determined on the basis of vehicle data provided. This vehicle data is preferably contained in a bus message which is transmitted via a vehicle bus of the vehicle, for example a CAN bus, and is received by a device which is set up for carrying out the method 100. This device may, for example, comprise a control device which is set up for determining the current total distance traveled, in particular by the total travel distance being derived from the vehicle data, in a preferred manner from sensor data contained therein, or by the total travel distance being read out from the vehicle data, for example as a numerical value.

In a further method step S2, travel distance data which characterizes the current total distance traveled which has been determined is stored in a first memory area 1 of a first non-volatile data memory 2, for example an EEPROM. As a rule, the first memory area 1 already contains travel distance data which was stored in the first memory area 1 at a first earlier point in time and which characterizes a total distance traveled by the vehicle at the first earlier point in time. This travel distance data already stored in the first memory area 1 is preferably changed or updated in method step S2, i. e. when the current travel distance data is being stored, in such a way that the travel distance data which is stored in the memory area 1 after this change characterizes the current total distance traveled. Alternatively, the travel distance data already stored in the first memory area 1 is replaced, in method step S2, by the current travel distance data which characterizes the current total distance traveled. In any case, an increase in the total distance traveled, as characterized by the travel distance data stored in the first memory area 1, takes place by the storage process.

The non-volatile first data memory 2, in particular the first memory area 1, is preferably set up in such a way that, in particular in the first memory area 1, only such a total travel distance can be stored by travel distance data that is greater than a total travel distance at the first earlier point in time. The non-volatile first data memory 2, in particular the first memory area 1, can be set up in such a way that it does not permit any changes to the travel distance data already stored in it, insofar as these changes correspond to a reduction in the corresponding total travel distance. A non-volatile first data memory 2, in particular a first memory area 1, which is set up in this way is also referred to as an incremental memory, in which the total travel distance can be stored in a secured manner by travel distance data.

In a further method step S3, a first reference total travel distance, which is characterized by first reference travel distance data which was stored in a second memory area 3 at a second earlier point in time, is compared, within the framework of a first comparison, with the current total distance traveled, as characterized by the travel distance data which is stored in the first memory area 1. As a rule, the second earlier point in time is further in the past than the first earlier point in time.

If, according to the result of the first comparison, a predetermined first criterion is fulfilled, for example that the current total distance traveled is greater than the first reference total travel distance by at least a predetermined value, in particular by at least 10 km, the travel distance data which is stored in the first memory area 1 is stored as current first reference travel distance data in the second memory area 3 in method step S4. The travel distance data which is stored in the first memory area 1 and which characterizes the current total distance traveled can be copied from the first memory area 1 to the second memory area 3, where it forms the updated first reference travel distance data.

The first reference travel distance data which is stored in this process therefore characterizes an updated first reference total travel distance, which, in future comparisons, can be compared with a total travel distance determined at a future point in time.

Preferably, the first reference travel distance data is stored in method step S4 in addition to the first reference travel distance data already stored in the second memory area 3, which until then characterized the first reference travel distance, so that the second memory area 3 contains a history of the total distance traveled.

The first reference travel distance data is stored in method step S4, preferably in an encrypted form, in the second memory area 3. For this purpose, a cryptographic key is accessed, for example by the control device, by which cryptographic key the encryption can be carried out, preferably with a symmetrical encryption method, for example with the AES-128, preferably with the AES-196, in particular with AES-256. The cryptographic key can be stored in the second memory area 3 or in a further memory area of the non-volatile first data memory 2, as shown in the present example embodiment. As an alternative, the cryptographic key can however also be stored in a further memory area of a further non-volatile data memory (not shown).

In case, according to the result of the first comparison in method step S3, the total travel distance has however not increased according to the first criterion when compared with the first reference total travel distance, a test is carried out in a further method step S5 so as to check whether a current total fuel consumption of the vehicle, which is preferably also determined on the basis of the vehicle data, is greater, by at least a predetermined value, than a total fuel consumption at the second earlier point in time.

The total fuel consumption of the vehicle at the second earlier point in time is preferably stored in the second memory area 3 of the non-volatile first data memory 2 in the form of consumption data in addition to the first reference travel distance data, and can be read out for the test in method step S5.

If the test shows that the current total fuel consumption is greater by at least the predetermined value, for example by at least one liter, then the method 100 is continued at method step S4. In the course of this, the current total fuel consumption of the vehicle in the form of consumption data is preferably also stored in the second memory area 3 in method step S4, in addition to the first reference travel distance data, in order to be available for future tests.

However, if the test which is carried out in method step S5 shows that the current total fuel consumption is not greater, by at least the predetermined value, than the total fuel consumption at the second earlier point in time, the method 100 is continued at a further method step S9.

Preferably at the same time as, and independently of, method step S3, in a further method step S6 a second reference total travel distance, which is characterized by second reference travel distance data stored in a further memory area 4 at a third earlier point in time, is compared, within the framework of a second comparison, with the current total distance traveled, as characterized by the travel distance data stored in the first memory area 1. As a rule, the third earlier point in time is further in the past than the second and/or the first earlier point in time.

If, according to the result of the second comparison, a predetermined second criterion is fulfilled, for example that the current total distance traveled is greater than the second reference total travel distance by at least a second predetermined value, in particular by at least 100 km, the travel distance data which is stored in the first memory area 1 is stored as current second reference travel distance data in the further memory area 4 in method step S7. The travel distance data which is stored in the first memory area 1 and which characterizes the current total distance traveled can be copied from the first memory area 1 to the further memory area 4, where it forms the updated second reference travel distance data.

The second reference travel distance data which is stored in this process therefore characterizes an updated second reference total travel distance, which, in future comparisons, can be compared with a total travel distance determined at a future point in time.

In this context, the non-volatile second data memory 5 is preferably arranged such that it is spatially separated from the non-volatile first data memory 2 and is constructed as a flash memory, for example.

Preferably, the second reference travel distance data is stored in method step S7 in addition to the second reference travel distance data already stored in the further memory area 4, which until then characterized the second reference travel distance, so that the further memory area 4 also contains a history of the total distance traveled.

The second reference travel distance data is stored in method step S7, preferably in an encrypted form, in the additional memory area 4. For this purpose, a cryptographic key is accessed, for example by the control device, by which cryptographic key the encryption can be carried out, preferably with a symmetrical encryption method, for example with AES-128, preferably with AES-196, in particular with AES-256. The cryptographic key can, as shown in the present example embodiment, be stored in a hardware security module 9, in particular in a separate hardware security module 9, which can be accessed by the control device.

In case, according to the result of the second comparison in method step S6, the total travel distance has however not increased according to the second criterion when compared with the second reference total travel distance, a test is carried out in a further method step S8 so as to check whether the current total fuel consumption of the vehicle is greater, by at least a further predetermined value, than a total fuel consumption at the third earlier point in time.

The total fuel consumption of the vehicle at the third earlier point in time is preferably stored in the further memory area 4 of the non-volatile second data memory 5 in the form of further consumption data in addition to the second reference travel distance data, and can be read out for the test in method step S8.

If the test shows that the current total fuel consumption is greater by at least the further predetermined value, for example by at least 10 liters, then the method 100 is continued at method step S7. In the course of this, the current total fuel consumption of the vehicle in the form of further consumption data is preferably also stored in the third memory area 4, in addition to the second reference travel distance data, in order to be available for future tests.

However, if the test which is carried out in method step S8 shows that the current fuel consumption is not greater, by at least the further predetermined value, than the total fuel consumption at the third earlier point in time, the method 100 is continued at a further method step S9.

Preferably, the method 100 is carried out cyclically with a predetermined processing clock, wherein the method step S1 starts a clock cycle and the method step S9 ends this clock cycle, if applicable after updating the reference travel distance data in method steps S4 and/or S7. After method step S9, a new clock cycle begins with the method step S1.

The predetermined processing clock can be a time clock, whereby the method steps S1 to S9 are carried out at predetermined time intervals, for example once every second, preferably once every 10 seconds, in particular once every 60 seconds. Preferably, however, the predetermined processing clock is a spatial clock, whereby the method steps S1 to S9 are carried out at predetermined spatial intervals, for example at least every 5 km, preferably at least every 2 km, in particular at least every kilometer. In this case, the spatial interval of the processing clock corresponds to the increment by which the total travel distance which is stored in the first memory area 1 in the form of the travel distance data is increased.

In other words, the travel distance data, which characterizes the current total distance traveled which has been determined, is preferably stored in the first memory area 1 according to the predetermined processing clock. The memory area 1 can therefore preferably serve as a primary odometer, and a display of the total distance traveled, for example in a combination instrument of the vehicle, is preferably based on the travel distance data which is stored in the first memory area 1.

Since, by way of contrast, the first and the second reference travel distance data is stored in dependence upon the test with regard to the total fuel consumption and/or the result of the comparison of the current total distance traveled, respectively with the first and the second reference total travel distance, a respective storage clock which differs from the predetermined processing clock results for the storing of the first reference travel distance data in method step S4, as well as for the storing of the second reference travel distance data in method step S7. The first and/or the second reference travel distance data is stored less frequently in the second or the further memory area 3, 4 than the travel distance data in the first memory area 1.

For this reason, the first memory area 1 is preferably set up to store only the travel distance data which characterizes the current total distance traveled, while in each of the second and the further memory areas 3, 4 several first or second reference travel distance data can be stored, so that in each of these a history of the total distance traveled can be formed. For this purpose, the second and the further memory areas 3, 4 are preferably also set up to store a larger amount of data than the first memory area 1.

Figure 2:
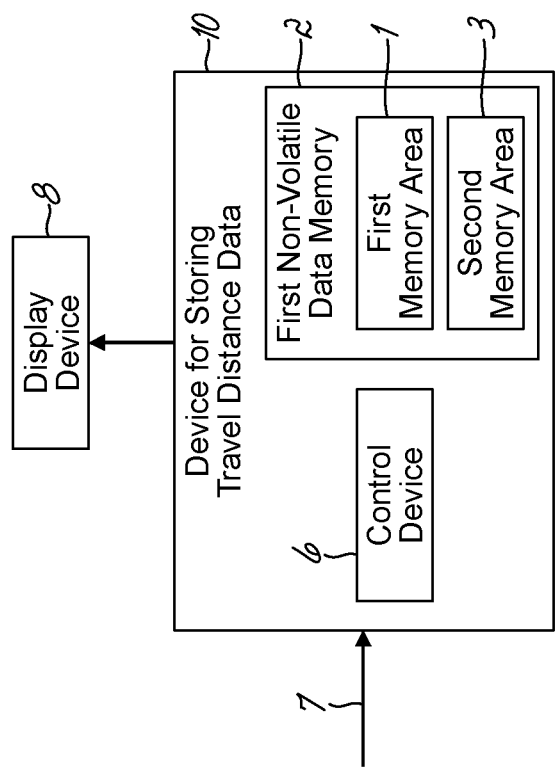
FIG. 2 is a schematic diagram showing one embodiment of a device in accordance with the invention.

FIG. 2 shows an example embodiment of a device 10 in accordance with the invention for storing travel distance data which characterizes a total distance traveled by a vehicle, in particular a motor vehicle. The device 10 comprises a control device 6 and a non-volatile first data memory 2. The non-volatile first data memory 2 comprises a first memory area 1 and a second memory area 3.

The device 10 is connected to one or more control devices of the vehicle via a vehicle bus 7, in particular a CAN bus, so that bus messages which are sent via the vehicle bus 7 can be received by the device 10 and can be processed by the control device 6. The control device 6 is preferably set up to read a current total distance traveled by the vehicle from a bus message, in particular to derive it from the vehicle data contained therein.

Based on the current total distance traveled which has been determined, travel distance data which characterizes the total travel distance is stored, by the control device 6, in the first memory area 1 of the non-volatile first data memory 2, for example by older travel distance data, which is already stored in the first memory area 1 and which characterizes a total distance traveled at a first earlier point in time, being overwritten or by it being changed in such a way that, after the change, it characterizes the current total distance traveled.

The device 10 is preferably connected to a display device 8, which is set up to display the current total distance traveled. The corresponding travel distance data can be read out, for example by the control device 6, from the first memory area 1, which preferably serves as the primary travel distance memory, and made available on the display device 8.

In addition, the control device 6 is set up to carry out a comparison of the current total distance traveled, as characterized by the travel distance data which is stored in the first memory area 1, with a first reference total travel distance, which is characterized by first reference travel distance data which is stored in the second memory area 3, and, depending on the result of the comparison, to store the travel distance data from the first memory area 1 as updated, in particular additional, first reference travel distance data in the second memory area 3. In the course of this, the travel distance data from the first memory area 1 is stored as first reference travel distance data in the second memory area 3 if the total travel distance which is characterized by the travel distance data is greater, by a predetermined value, for example 100 km, than the first reference total travel distance which is characterized by the first reference travel distance data.

This means that the total travel distance is stored less frequently in the second memory area 3 than in the first memory area 1. Preferably, the first memory area 1 therefore has short access or write times and only has memory space for a single total travel distance stored in the form of travel distance data, while the second memory area 3 preferably has a larger memory space for several first reference total travel distances stored in the form of first reference travel distance data, so that the second memory area 3 can contain a history of the total distance traveled.

The first memory area 1 is set up to store only those total travel distances in the form of travel distance data which are greater than a total distance traveled at the earlier first point in time, which is characterized by the older travel distance data which is already stored in the first memory area 1. The first memory area 1 can be set up to receive a memory signal which is output by the control device 6, in particular according to a predetermined processing clock, and thereupon to change or replace the travel distance data stored in it in such a way that the total travel distance characterized by it is incremented. As a result of this "activation" of the first memory area 1 by the memory signal, the total travel distance stored in the first memory area 1 in the form of travel distance data is increased incrementally. Therefore, the travel distance data stored in the first memory area 1 is secured, i.e. protected against a manipulation by resetting the total travel distance.

In order further to increase the protection of the total travel distance stored in the form of travel distance data, the first reference travel distance data is preferably stored in the second memory area 3 in an encrypted manner. By the comparison which is carried out by the control device 6, the total travel distance stored in the first memory area 1 in the form of travel distance data can be checked for plausibility and, if necessary, be restored by the current first reference travel distance data from the second memory area 3 being written into the first memory area 1.

The combination of the secured storage of the travel distance data in the first memory area 1 with the encrypted storage of the first reference travel distance data in the second memory area 3 therefore enables a particularly reliable protection of the total travel distance stored in the form of travel distance data.

While at least one example embodiment has been described above, it should be noted that there are a large number of variations to this. It is also to be noted that the embodiments described by way of example only represent non-limiting examples, and it is not intended to thereby limit the scope, the applicability or the configuration of the devices and methods described here. Rather, the preceding description will provide the skilled person with instructions for the implementation of at least one example embodiment, it being understood that various changes can be made in the functionality and arrangement of the elements described in an example embodiment, without deviating from the subject matter respectively defined in the appended claims, as well as their legal equivalents.

What is claimed is:

1. A method of storing, in a memory device, travel distance data which characterizes a total distance traveled by a vehicle the method comprising:

storing travel distance data in a non-volatile first memory area of the memory device, wherein the travel distance data characterizes a total distance traveled by the vehicle, determined based on vehicle data determined by the vehicle, the storing of the travel distance data occurring only if this results in an increase in a total travel distance already previously stored therein, wherein the first memory area is configured to prohibit any change in the travel distance data that is already stored therein that would result in a reduction in the total travel distance;

comparing, in a first comparison, a first reference total travel distance, which is stored in a second memory area of the memory device, wherein the second memory area is different from the first memory area, with the total travel distance which is currently stored in the first memory area; and if, according to the first comparison, the total travel distance has increased compared with the first reference total travel distance according to a predetermined first criterion, storing updated first reference travel distance data corresponding to the total travel distance in the second memory area in an encrypted form.

2. The method of claim 1, wherein, in case the total distance traveled has decreased when compared with the first reference total travel distance according to the first comparison and according to a predetermined criterion, the travel distance data stored in the first memory area is updated in such a way that it now corresponds to the first reference total travel distance.

3. The method of claim 2, wherein, in addition to updating the travel distance data in the first memory area, indicator information regarding an occurrence of the comparison result is stored or output at an interface in case the total travel distance has decreased when compared with the first reference total travel distance according to the first comparison and according to the predetermined criterion.

4. The method of claim 3, wherein the travel distance data which is stored in the first memory area is stored in the second memory area as first reference travel distance data if, in the first comparison, it is determined that the second memory area does not contain any first reference travel distance data, wherein the method further comprises:

comparing, in a second comparison, the total distance traveled, which is stored by the travel distance data in the first memory area, with a second reference total travel distance, which is stored by second reference travel distance data in a further memory area; and if, according to the second comparison, the total travel distance has increased with respect to the second reference total travel distance in accordance with a predetermined second criterion, storing updated second reference travel distance data in the further memory area in an encrypted form, wherein the updated second reference travel distance data corresponds to the total travel distance, wherein at least one of the first criterion and the second criterion is defined in such a way that it is met if the total distance traveled, as characterized by the travel distance data stored in the first memory area, is greater than a corresponding one of the first reference travel distance and the second reference travel distance by more than 10 km, wherein a current total fuel consumption of the vehicle which is derived from the vehicle data is taken into account in the course of at least one of the first comparison and the second comparison, wherein the first reference travel distance data is stored in the second memory area if the current total fuel consumption of the vehicle has increased by more than 100 liters when compared with a total fuel consumption of the vehicle at an earlier point in time, wherein the first reference travel distance data in the second memory area is encrypted and decrypted by accessing at least one cryptographic key which is stored in a key storage, wherein a history of the total distance traveled is generated in at least one of the second memory area and the further memory area by first reference travel distance data or second reference travel distance data being stored in addition to reference travel distance data already stored in the second or the further memory area, wherein the travel distance data is stored in the first memory area in such a way that a current total distance traveled which is characterized by the travel distance data is increased incrementally by a predetermined value when compared with the total distance traveled at an earlier point in time.

5. The method of claim 4, wherein at least one of the first criterion and the second criterion is defined in such a way that it is met if the total distance traveled, as characterized by the travel distance data stored in the first memory area, is greater than a corresponding one of the first reference travel distance and the second reference travel distance by more than 1000 km.

6. The method of claim 4, wherein the first reference travel distance data is stored in the second memory area if the current total fuel consumption of the vehicle has increased by more than 1 liter when compared with a total fuel consumption of the vehicle at an earlier point in time.

7. The method of claim 1, wherein the travel distance data which is stored in the first memory area is stored in the second memory area as first reference travel distance data if, in the first comparison, it is determined that the second memory area does not contain any first reference travel distance data.

8. The method of claim 1, further comprising:

comparing, in a second comparison, the total distance traveled, which is stored by the travel distance data in the first memory area, with a second reference total travel distance, which is stored by second reference travel distance data in a further memory area; and if, according to the second comparison, the total travel distance has increased with respect to the second reference total travel distance in accordance with a predetermined second criterion, storing updated second reference travel distance data in the further memory area in an encrypted form, wherein the updated second reference travel distance data corresponds to the total travel distance.

9. The method of claim 1, wherein the first criterion is defined in such a way that it is met if the total distance traveled, as characterized by the travel distance data stored in the first memory area, is greater than the first reference travel distance by more than 10 km.

10. The method of claim 1, wherein a current total fuel consumption of the vehicle which is derived from the vehicle data is taken into account in the first comparison.

11. The method of claim 10, wherein the first reference travel distance data is stored in the second memory area if the current total fuel consumption of the vehicle has increased by more than 100 liters when compared with a total fuel consumption of the vehicle at an earlier point in time.

12. The method of claim 1, wherein the first reference travel distance data in the second memory area is encrypted and decrypted by accessing at least one cryptographic key which is stored in a key storage.

13. The method of claim 1, wherein a history of the total distance traveled is generated in the second memory area by first reference travel distance data being stored in addition to reference travel distance data already stored in the second memory area.

14. The method of claim 1, wherein the travel distance data is stored in the first memory area in such a way that a current total distance traveled which is characterized by the travel distance data is increased incrementally by a predetermined value when compared with the total distance traveled at an earlier point in time.

15. A device for storing travel distance data for a vehicle, comprising:
a memory device including a first memory area and a second memory area; and
a control device that operates to:
store travel distance data in the first memory area, wherein the travel distance data characterizes a total distance traveled by the vehicle, determined based on vehicle data determined by the vehicle, the storing of the travel distance data occurring only if this results in an increase in a total travel distance already previously stored therein, wherein the first memory area is configured to prohibit any change in the travel distance data that is already stored therein that would result in a reduction in the total travel distance;
compare, in a first comparison, a first reference total travel distance, which is stored in the second memory area, with the total travel distance which is currently stored in the first memory area; and
if, according to the first comparison, the total travel distance has increased compared with the first reference total travel distance according to a predetermined first criterion, storing updated first reference travel distance data corresponding to the total travel distance in the second memory area in an encrypted form.

16. The device of claim 15, wherein the memory device further includes at least two non-volatile data memories which are spatially separated from each other, wherein each of the non-volatile data memories provides at least one memory area, of which two are the first and second memory areas.

17. The device of claim 16, wherein at least one of the two non-volatile data memories is defined by one of the following:
EEPROM,
flash memory, and
reference database external to the vehicle.

18. A motor vehicle comprising the device of claim 15.

* * * * *